United States Patent Office 2,867,633
Patented Jan. 6, 1959

2,867,633
11-OXYGENATED-6-METHYL-17α-HYDROXY-4-PREGNENE-3,20-DIONES

Frank H. Lincoln, Jr., Kalamazoo, and William P. Schneider and George B. Spero, Kalamazoo Township, Kalamazoo County, Mich., assignors to The Upjohn Company, Kalamazoo, Mich., a corporation of Michigan No Drawing. Application November 23, 1956
Serial No. 623,790

5 Claims. (Cl. 260—397.45)

The present invention relates to steroid compounds and is more particularly concerned with 6-methyl-11β,-17α - dihydroxy-4-pregnene-3,20-dione, 6-methyl-17α-hydroxy-4-pregnene-3,11,20-trione, the intermediate 21-iodo substituted 6-methyl-11β,17α-dihydroxy-4-pregnene-3,20-dione, and a process for the production thereof.

The new compounds and the process of the present invention are illustratively represented by the following formulae:

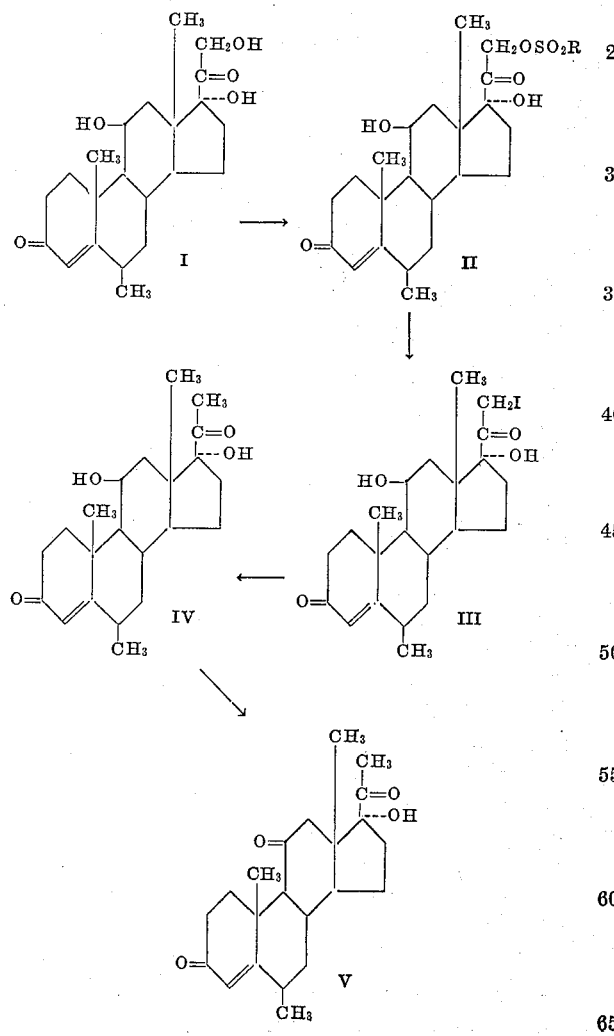

wherein R is an organic radical such as methyl, ethyl, phenyl, tolyl, naphthyl, or the like, with methyl preferred.

The process of the present invention comprises treating 6-methyl-11β,17α,21-trihydroxy-4-pregnene-3,20-dione (6-methylhydrocortisone) (I) with an organic sulfonyl halide such as methanesulfonyl chloride, toluenesulfonyl chloride, toluenesulfonyl bromide, benzenesulfonyl chloride, naphthylsulfonyl chloride, or the like, to obtain the corresponding ester (II), a 21-alkyl- or arylsulfonate of 6-methyl-11β,17α,21-trihydroxy-4-pregnene - 3,20 - dione; treating the thus produced 21-alkyl- or arylsulfonate of 6-methyl-11β,17α,21-trihydroxy - 4 - pregnene-3,20-dione with sodium iodide in acetone solution to obtain 6-methyl-11β,17α-dihydroxy - 21 - iodo-4-pregnene-3,20 - dione (III); treating the thus obtained 6-methyl-11β,17α-dihydroxy-21-iodo-4-pregnene-3,20-dione with a reducing agent such as zinc dust, sodium thiosulfate, sodium bisulfite, potassium bisulfite, or the like, in an aqueous organic solvent mixture to obtain 6-methyl-11β,17α-dihydroxy-4-pregnene-3,20-dione (IV) and if desired oxidizing the thus obtained 6-methyl-11β,17α-dihydroxy-4-pregnene-3,20-dione with an oxidant such as chromic anhydride, N-bromoacetamide, N-bromosuccinimide, or the like, to give 6-methyl-17α-hydroxy-4-pregnene-3,11, 20-trione (V).

It is an object of the instant invention to provide 6 - methyl - 11β,17α - dihydroxy-4-pregnene-3,20-dione, 6-methyl-17α-hydroxy-4-pregnene-3,11,20-trione, and the intermediate, 6-methyl-11β,17α-dihydroxy-21-iodo-4-pregnene-3,20-dione and in particular the highly active 6α-epimers, 6α-methyl-11β,17α - dihydroxy-4-pregnene-3,20-dione and 6α-methyl-17α-hydroxy-4-pregnene-3,11,20-trione. It is another object of the instant invention to provide a process for the preparation of 6-methyl-11β,-17α-dihydroxy-4-pregnene-3,20-dione, its 21-iodo derivative and 6-methyl-17α-hydroxy-4-pregnene-3,11,20-trione. Other objects of this invention will be apparent to those skilled in the art to which this invention pertains.

The novel 6 - methyl - 11β,17α-dihydroxy-4-pregnene-3,20-dione and the 6-methyl-17α-hydroxy-4-pregnene-3,11,20-trione especially in their 6α-epimeric form possess a high order of physiological activity, and possess activity spectra different from the adrenocortical hormones found in nature such as hydrocortisone and cortisone, especially in their effect on mineral and water metabolism. These compounds cause a loss of salt and water which makes them especially valuable in the management of chronic congestive heart failure and in the treatment of cirrhosis of the liver, the nephrotic syndrome and the treatment of eclampsia and preeclampsia. The novel synthetic corticosteroid hormones of the present invention possess also anti-inflammatory, glucocorticoid, anesthetic, uterine, ovarial and adrenal growth-depressional, and adrenal corticoid activity. The anti-inflammatory activity is notable in all the steroids of the present invention.

The novel 6α-methyl-11β,17α-dihydroxy-4-pregnene-3,20-dione and 6α-methyl-17α-hydroxy-4-pregnene-3,11, 20-trione are useful in oral, parenteral and topical compositions. In oral compositions the material may be given as tablets illustratively using either polyethylene glycol 4000 or 6000 as a carrier, or lactose and/or sucrose as a diluent. The novel 6α-methyl-11β,17α-dihydroxy-4-pregnene-3,20-dione and 6α-methyl-17α-hydroxy-4-pregnene-3,11,20-trione are useful for topical application as ointments, lotions, jellies, creams, suppositories, bougies, aqueous suspensions etc. Examples of especially advantageous topical preparations of suitable compositions are given below. While the examples below are to the 6α-methyl-11β,17α-dihydroxy-4-pregnene-3,20-dione and 6α-methyl-17α-hydroxy-4-pregnene - 3,11,20-trione, equivalent amounts of the 6β-epimers and of other 6-lower-alkyl and phenyl homologues of the compound of this invention are substitutable therein.

A suitable dermatological and ophthalmic ointment has the following composition:

| | Pounds |
|---|---|
| Wool fat, USP | 100 |
| Mineral oil, USP | 125 |
| 6α-methyl-11β,17α-dihydroxy-4-pregnene-3,20 - dione (micronized) | 10 |
| White petrolatum, USP | 500 |

Incorporation of an antibiotic in the ointment, especially neomycin sulfate, has therapeutic advantages, each active ingredient potentiating and supplementing the useful properties of the other. Such an ointment is as follows:

| | Pounds |
|---|---|
| Wool fat, USP | 100 |
| Mineral oil, USP | 125 |
| Neomycin sulfate | 3 |
| 6α-methyl-11β,17α-dihydroxy-4-pregnene-3,20 - dione (micronized) | 5 |
| White petrolatum, USP | 500 |

In place of, or in addition to, neomycin sulfate, other antibiotics such as bacitracin, circulin, polymyxin B sulfate, gramicidin, streptomycin sulfate, dihydrostreptomycin sulfate, oxytetracycline, chlorotetracycline, tetracyline, chloramphenicol and the sulfonamides can be used in conjunction with the steroids of the present invention in preparations such as the above ointments.

These novel 6-methyl steroid compounds having a strong salt-losing property are also suitable in compositions with other steroids such as cortisone and hydrocortisone to counterbalance the salt-retaining activity of hydrocortisone and cortisone.

The compounds of the instant invention, 6-methyl-11β,17α-dihydroxy-4-pregnene-3,20-dione and the 11-keto analogues thereof are also useful as starting materials for the preparation of other physiologically important compounds. For example, the 9α-halo analogues, especially 6α-methyl-9α-fluoro-11β,17α-dihydroxy-4-pregnene-3,20-dione and 6α-methyl-9α-fluoro-17α-hydroxy-4-pregnene - 3,11,20 - trione can be prepared as shown in Examples 11 and 12. The halo derivatives, 6α-methyl-9α-fluoro-11β,17α-dihydroxy-4-pregnene-3,20-dione and 6α-methyl - 9α - fluoro - 17α - hydroxy - 4 - pregnene-3,11,20-trione are compounds having glucocorticoid and anti-inflammatory activity and may be used instead of or with 6α - methyl - 11β,17α - dihydroxy - 4 - pregnene-3,20 - dione and 6α - methyl-17α-hydroxy-4-pregnene-3,11,20-trione in the above pharmaceutical compositions.

The starting compounds of the instant invention are 6α-methylhydrocortisone and 6β-methylhydrocortisone or other 6-alkylhydrocortisones prepared as shown in Preparations 1 through 9.

In carrying out the process of the instant invention, 6-methylhydrocortisone is treated with an acid halide of an organic sulfonic acid such as methanesulfonic acid, ethanesulfonic acid, propanesulfonic acid, benzenesulfonic acid, p-toluenesulfonic acid, α- or β-naphthanesulfonic acid, or the like, with methanesulfonic acid halides especially methanesulfonyl chloride preferred. In the preferred embodiment of the instant invention the steroid is usually reacted with the alkyl- or arylsulfonyl halide in solution in a solvent such as pyridine, benzene, toluene, or the like at a temperature between minus ten and plus sixty degrees centigrade, providing that at the lower temperature the solvent has not solidified. Thus for pyridine, dioxane, toluene, or the like, temperatures around zero to ten degrees can be used while for benzene only temperatures above five degrees centigrade are suitable on account of the latter's relatively high melting point. The time of reaction is usually between thirty minutes and six or eight hours, after which the product, 6-methyl-11β,17α,21 - trihydroxy - 4 - pregnene - 3,20 - dione 21-alkyl- or arylsulfonate is recovered in conventional manner, for example, by evaporating the solvent until a dry residue is obtained or by extracting the material from an aqueous solution. For extraction, solvents such as methylene chloride, chloroform, carbon tetrachloride, benzene, ether, toluene, or the like may be used. Removing the extraction solvent by distillation leaves the crude 6 - methyl - 11β,17α,21 - trihydroxy - 4 - pregnene-3,20-dione 21-alkyl- or arylsulfonate.

For the purpose of producing the final product, it is unnecessary to purify the thus obtained aryl- or alkylsulfonate, and the crude steroid sulfonate ester can be used directly for the production of the subsequent intermediate 6 - methyl - 11β,17α - dihydroxy - 21 - iodo - 4-pregnene-3,20-dione.

The 21-iodo compound is prepared by reacting the alkyl- or arylsulfonate of 11β,17α,21-trihydroxy-4-pregnene-3,20-dione with sodium or potassium iodide in an alkanone solution, such as in acetone. A molar excess of sodium iodide (three to twenty moles of sodium iodide per mole of steroid) is generally preferred for this reaction. The reaction mixture containing 6-methyl-11β,17α,21 - trihydroxy - 4 - pregnene - 3,20 - dione 21-alkyl- or arylsulfonate and sodium iodide in acetone is heated to reflux for a period of three or four minutes to half an hour. The thus produced 6-methyl-17α-hydroxy-21-iodo-4-pregnene-3,20-dione is isolated by evaporating the solvent. For the subsequent reaction it is unnecessary to carefully purify the 6-methyl-11β,17α-dihydroxy-21-iodo-4-pregnene-3,20-dione.

In order to obtain 6-methyl-11β,17α-dihydroxy-4-pregnene-3,20-dione, the crude 6-methyl-11β,17α-dihydroxy-21-iodo-4-pregnene-3,20-dione is reacted with a reducing agent such as zinc dust in acetic acid, sodium or potassium thiosulfate, or sodium bisulfite. In the preferred embodiment of the invention the 21-iodo compound is reduced with zinc dust in acetic acid by slurrying the crude iodo compound in a solvent such as acetic acid and adding an excess of zinc dust under stirring. The zinc dust is usually used in excess of five to ten times or more mole equivalents of zinc to each mole equivalent of 6-methyl - 11β,17α - dihydroxy - 21 - iodo - 4 - pregnene-3,20-dione. The time of reaction is not critical and is generally between a few minutes and one to two hours. Excess of zinc is removed at the end of the reaction by filtration, the filtrate neutralized and the compound 6-methyl - 11β,17α - dihydroxy - 4 - pregnene - 3,20 - dione obtained by conventional means such as recrystallization of the compound or extraction and thereafter purification of the compound by recrystallization or chromatography as deemed necessary. If sodium bisulfite or sodium thiosulfate is used for the dehalogenation of the 21-iodo steroid, the reaction is generally carried out at room temperature in aqueous acetic acid solution under continuous stirring.

The oxidation of 6-methyl-11β,17α-dihydroxy-4-pregnene-3,20-dione is generally carried out in conventional manner such as, for example, oxidizing the 6-methyl-11β,17α - dihydroxy - 4 - pregnene - 3,20 - dione in acetic acid solution with chromic anhydride using a calculated amount of chromic anhydride or a slight excess such as from ten to thirty percent excess of the calculated amount, or oxidizing the 6-methyl-11β,17α-dihydroxy-4-pregnene-3,20-dione with a halo amide or imide of an acid, e. g., N-bromoacetamide, N-chlorosuccinimide, or N-bromosuccinimide, in pyridine, dioxane, or other solvent solutions. After termination of the oxidation reaction, the oxidant is generally destroyed such as by addition of methyl alcohol, ethyl alcohol for the chromic acid oxidant or bisulfite for either chromic acid, N-bromoacetamide, N-bromosuccinimide and other N-halo acyl amides and imides. Thereafter, the product 6-methyl-17α-hydroxy-4-pregnene-3,11,20-trione is isolated by conventional means such as extraction with water-immiscible solvents, for example, methylene chloride, ethylene chloride, chloroform, carbon tetrachloride, ether, benzene, toluene, or the like, or chromatography if deemed necessary.

The following preparations and examples are illustrative of the process and products of the present invention, but are not to be construed as limiting.

PREPARATION 1

*5α,6α-oxido-11β,17α,21-trihydroxyallopregnane-3,20-dione 3,20-bis-(ethylene ketal)*

To a solution of 0.901 gram of 11β, 17α, 21-trihydroxy-5-pregnene-3,20-dione 3,20-bis-(ethylene ketal) in eighteen milliliters of chloroform was added a solution of 331 milligrams of perbenzoic acid in 5.19 milliliters of chloroform. The resulting solution was allowed to stand in the refrigerator (ca. four degrees centigrade) for a period of 24 hours and thereupon at room temperature for an additional period of 72 hours. The reaction solution was then washed with five percent sodium bicarbonate solution and water, dried over anhydrous sodium sulfate and evaporated to dryness to give 1.031 grams of crude solid. Recrystallization from acetone gave 431 milligrams of material of melting point 230 to 247 degrees centigrade. The mother liquor, after evaporation to dryness, was dissolved in methylene chloride and chromatographed over 25 grams of acid washed alumina. The column was developed with three fractions each of methylene chloride plus five, ten, fifteen, twenty, 25 and fifty percent acetone, acetone, and acetone plus five percent methanol. The acetone plus five percent methanol eluate gave an additional 279 milligrams of the high melting product. The high melting material, 5α,6α-oxido-11β,17α,21-trihydroxyallopregnane-3,20-dione 3,20-bis-(ethylene ketal) was three times recrystallized from acetone and methanol to give a pure product of melting point 263 to 268 degrees centigrade. Other eluate fractions of lower melting point contained the 5β,6β-isomer thereof.

PREPARATION 2

*5α,6α-oxido-17α,21-dihydroxypregnane-3,11,20-trione 3,20-bis-(1,2-propylene ketal)*

To a solution of one gram of 17α,21-dihydroxy-5-pregnene-3,11,20-trione 3,20-bis-(1,2-propylene ketal) [cortisone 3,20-bis-(1,2-propylene ketal)] in chloroform was added a solution of perbenzoic acid in chloroform and the resulting solution allowed to stand in a refrigerator and then at room temperature, following the procedure of Preparation 1. The reaction solution was washed, dried, and evaporated as in Preparation 1. Recrystallization from acetone followed by fractionation of the mother liquor on a column of acid washed alumina, using the technique of Preparation 1 yielded 5α, 6α-oxido-17α,21-dihydroxyallopregnane-3,11,20-trione 3,20-bis-(1,2-propylene ketal) and the 5β,6β-oxido isomer.

Using as starting material the more commonly available cortisone 3,20-bis-(ethylene ketal) gives the 5α,6α-oxido-17α,21-dihydroxyallopregnane-3,11-20-trione 3,20-bis-(ethylene ketal).

In the same manner as shown in Preparations 1 and 2, 5α,6α-oxido-11β,17α,21-trihydroxyallopregnane-3,20-dione 3,20-bis-(alkylene ketals) and 5α,6α-oxido-17α,21-dihydroxyallopregnane-3,11,20-trione 3,20-bis-(alkylene ketals) can be prepared by reacting cortisone and hydrocortisone diketal wherein the ketal group has been formed by reacting the steroid 3,20-dione with ethylene, propylene, 1,2-, 1,3-, or 2,3-butylene glycol or pentane, hexane, heptane, or octane-diols wherein the alcohol groups are in vicinal positions such as 1,2, 2,3, 3,4, or the like, or separated by one carbon atom such as 1,3, 2,4, 3,5, and the like, with an organic peracid such as performic, peracetic, perbenzoic, monoperphthalic acid, or the like. For the purpose of this invention, starting compounds having the ethylene ketal groups are preferred, since these ketals are generally more easily prepared in high yield than ketals produced by the reaction of the 3,20-diketo compounds with higher alkane-diols.

PREPARATION 3

*5α,11β,17α,21-tetrahydroxy-6β-methylallopregnane-3,20-dione 3,20-bis-(ethylene ketal)*

A solution of 1.115 grams of 5α,6α-oxido-11β,17α,21-trihydroxyallopregnane-3,20-dione 3,20-bis-(ethylene ketal) in 165 milliliters of tetrahydrofuran (the tetrahydrofuran being dried through distillation over lithium aluminum hydride) was added dropwse to a solution of 95 milliliters of methyl magnesium bromide in ether (the magnesium bromide having a four molar concentration). To this mixture was added 575 milliliters of benzene and the reaction mixture was thereupon allowed to stir and reflux for 26 hours. After cooling, the reaction mixture was poured into 700 milliliters of iced, saturated ammonium chloride solution, stirred for a period of thirty minutes, and the benzene layer separated from the aqueous layer. The aqueous phase was extracted with three 200-milliliter portions of ethyl acetate and the extracts added to the benzene layer. The combined benzene-ethyl acetate solution was thereupon washed with water, dried over anhydrous sodium sulfate and evaporated to dryness to give 1.314 grams of crude solid. Trituration of this material with ether left 1.064 grams of crystalline product of melting point 221 to 230 degrees. Recrystallization of this material gave 5α, 11β, 17α,21-tetrahydroxy-6β-methylallopregnane-3,20-dione 3,20-bis-(ethylene ketal) of melting point 228 to 233 degrees and rotation [α]$_D$ minus eleven degrees in chloroform.

*Analysis.*—Calcd. for $C_{26}H_{42}O_8$: C, 64.70; H, 8.77. Found: C, 64.29; H, 8.69.

PREPARATION 4

*5α,11β,17α,21-tetrahydroxy-6β-ethylallopregnane-3,20-dione 3,20-bis-(ethylene ketal)*

In the same manner as shown in Preparation 3, 5α,6α-oxido-11β,17α,21-trihydroxyallopregnane-3,20-dione 3,20-bis-(ethylene ketal), was reacted with ethyl magnesium bromide in ether solution to give the corresponding 5α,11β,17α,21-tetrahydroxy-6β-ethylallopregnane-3,20-dione 3,20-bis-(ethylene ketal).

In the same manner as shown in Preparations 3 and 4, other 5α,11β,17α,21-tetrahydroxy-6β-alkylallopregnane-3,20-dione 3,20-bis-(ethylene ketals) and 5α,17α,21-trihydroxy-6β-alkylallopregnane-3,11,20-trione 3,20-bis-(ethylene ketals) are prepared by reacting the corresponding 5α,6α-oxido-17α,21-dihydroxyallopregnane-3,20-dione 3,20-bis-(ethylene ketal) oxygenated in the 11-position with a metal alkyl or metal aryl more specifically an alkyl metal halide such as a Grignard reagent, for example, methyl, ethyl, propyl, isopropyl, butyl, pentyl, hexyl, and phenyl magnesium bromides and iodides or cadmium alkyl and calcium alkyl and phenyl bromides or iodides. Representative 6β-alkylated allopregnanes thus prepared include: 5α,11β,17α,21-tetrahydroxy-6β-propyl-allopregnane-3,20-dione 3,20-bis-(ethylene ketal), 5α,11β,17α,21-tetrahydroxy-6β-butylallopregnane-3,20-dione 3,20-bis-(ethylene ketal), 5α,11β,17α,21-tetrahydroxy-6β-isobutylallopregnane-3,20-dione 3,20-bis-(ethylene ketal), 5α,11β,17α,21-tetrahydroxy-6β-pentylallopregnane-3,20-dione 3,20-bis-(ethylene ketal), 5α,11β,-17α,21-tetrahydroxy-6β-hexylallopregnane-3,20-dione 3,20-bis-(ethylene ketal), 5α,11β,17α,21-tetrahydroxy-6β-phenylallopregnane-3,20-dione 3,20-bis-(ethylene ketal); 5α,17α,21-trihydroxy-6β-methylallopregnane-3,11,20-trione, 3,20-bis-(ethylene ketal), 5α,17α,21-trihydroxy-6β-ethylallopregnane-3,11,20-trione 3,20-bis-(ethylene ketal), 5α,17α,21-trihydroxy-6β-propylallopregnane-3,11,20-trione 3,20-bis-(ethylene ketal), 5α,17α,21-trihydroxy-6β-isopropylallopregnane-3,11,20-trione 3,20-bis-(ethylene ketal), 5α,17α,21-trihydroxy-6β-butylallopregnane-3,11,20-trione 3,20-bis-(ethylene ketal), 5α,17α,21-trihydroxy-6β-pentylallopregnane-3,11,20-trione 3,20-bis-(ethylene ketal), 5α,17α,21-trihydroxy-6β-hexylallopregnane-3,11,20-trione 3,20-bis-(ethylene ketal), 5α,17α,21-trihydroxy-6β-phenylallopregnane-3,11,20-trione 3,20-bis-(ethylene ketal), and the like.

PREPARATION 5

5α,11β,17α,21-tetrahydroxy-6β-methylallopregnane-3,20-dione

A solution was prepared containing 468 milligrams of 5α,11β,17α,21-tetrahydroxy-6β-methylallopregnane-3,20-dione 3,20-bis-(ethylene ketal), 38 milliliters of methanol and 7.7 milliliters of 2N sulfuric acid. This solution was refluxed for a period of thirty minutes, then neutralized with five percent dilute sodium bicarbonate solution (about 100 milliliters) and concentrated under reduced pressure at 55 degrees centigrade to about 35 milliliters of volume. A product crystallized upon cooling and was recovered by filtration. This product was recrystallized from acetone-Skellysolve B hexanes to give an analytical pure sample of 5α,11β,17α,21-tetrahydroxy-6β-methylallopregnane-3,20-dione of melting point 240 to 244 (decomposition) and rotation $[\alpha]_D$ plus forty degrees in dioxane.

Analysis.—Calcd. for $C_{22}H_{34}O_6$: C, 66.98; H, 8.69. Found: C, 66.84; H, 8.86.

PREPARATION 6

5α,11β,17α,21-tetrahydroxy-6β-ethylallopregnane-3,20-dione

In the same manner as shown in Example 5, 5α,11β,17α,21-tetrahydroxy-6β-ethylallopregnane-3,20-dione, 3,20-bis-(ethylene ketal) was hydrolyzed with dilute sulfuric acid in ethanol solution to give 5α,11β,17α,21-tetrahydroxy-6β-ethylallopregnane-3,20-dione.

In the same manner as shown in Preparations 5 and 6, inclusive, hydrolysis of the 6β-alkylallopregnane diketals, such as the 5α,11β,17α,21-tetrahydroxy-6β-allopregnane-3,20-dione 3,20-bis-(ethylene ketal), and 5α,17α,21-trihydroxy-6β-alkylallopregnane-3,11,20-trione 3,20-bis-(ethylene ketal) as well as those 6β-alkylallopregnane-3,20-dione 3,20-bis-(ketals) wherein the ketal group is other than ethylene can be hydrolyzed to give the corresponding 5α,17α,21-trihydroxy-6β-alkylallopregnane-3,20-diones oxygenated in the 11-position, such as for example, 5α,11β,17α,21-tetrahydroxy-6β-propylallopregnane-3,20-dione, 5α,11β,17α,21-tetrahydroxy-6β-butylallopregnane-3,20-dione; 5α,11β,17α,21-tetrahydroxy-6β-isobutylallopregnane-3,20-dione, 5α,11β,17α,21-tetrahydroxy-6β-pentylallopregnane-3,20-dione, 5α,11β,17α,21-tetrahydroxy-6β-hexylallopregnane-3,20-dione, 5α,11β,17α,21-tetrahydroxy-6β-phenylallopregnane-3,20-dione, 5α,17α,21-trihydroxy-6β-methylallopregnane-3,11,20-trione, 5α,17α,21-trihydroxy-6β-ethylallopregnane-3,11,20-trione, 5α,17α,21-trihydroxy-6β-propylallopregnane-3,11,20-trione, 5α,17α,21-trihydroxy-6β-isopropylallopregnane-3,11,20-trione, 5α,17α,21-trihydroxy-6β-butylallopregnane-3,11,20-trione, 5α,17α,21-trihydroxy-6β-hexylallopregnane-3,11,20-trione, 5α,17α,21-trihydroxy-6β-pentylallopregnane-3,11,20-trione, 5α,17α,21-trihydroxy-6β-phenylallopregnane-3,11,20-trione, and the like, and including those 6-alkylallopregnanes having ketal groups in positions 3 and 20 such as exemplified in Preparation 2.

PREPARATION 7

6α-methylhydrocortisone

A stream of nitrogen was bubbled through a solution of 429 milligrams of 5α,11β,17α,21-tetrahydroxy-6β-methylallopregnane-3,20-dione, contained in 100 milliliters of denatured absolute alcohol, for a period of ten minutes. To this solution was added 4.3 milliliters of 0.1 normal sodium hydroxide solution which had likewise been treated with nitrogen. The mixture was allowed to stand in a nitrogen atmosphere for a period of eighteen hours and thereupon acidified with acidic acid, and concentrated under reduced pressure at 55 degrees centigrade to dryness. The residue weighing 417 milligrams was recrystallized from acetone-Skellysolve B hexanes to give in two crops 249 miligrams of 6α-methylhydrocortisone melting between 184 and 194 degrees centigrade. An analytical sample was prepared melting at 203 to 208 degrees centigrade and consisting of pure 6α-methylhydrocortisone.

Analysis.—Calcd. for $C_{22}H_{32}O_5$: C, 70.18; H, 8.57. Found: C, 70.32; H, 8.50.

The mother liquors contained besides 6α-methylhydrocortisone, substantial amounts of 6β-methylhydrocortisone which can be isolated by recrystallization, papergram, countercurrent procedures and other means known in the art.

PREPARATION 8

6β-methylhydrocortisone

A solution was prepared containing 27.5 grams of 5α,11β,17α,21-tetrahydroxy-6β-methylallopregnane-3,20-dione in 6500 milliliters of ethanol denatured with methanol. The solution was freed of air oxygen by bubbling oxygen-free nitrogen through it for a period of fifteen minutes. To this solution was added a similarly air oxygen-free prepared solution of one-tenth normal sodium hydroxide (235 milliliters). The solution was allowed to stand at room temperature (about 22 to 24 degrees centigrade) in an inert nitrogen atmosphere for a period of twenty hours and was then acidified with fourteen milliliters of acetic acid. The thus obtained acid solution was evaporated at about fifty to sixty degrees centigrade in vacuo, the thus produced residue dissolved in 200 milliliters of ethyl acetate and 200 milliliters of water, the water layer separated from the organic layer and discarded, the organic layer washed with 350 milliliters of five percent aqueous sodium bicarbonate solution, then three times with water and thereupon dried over anhydrous sodium sulfate and concentrated to a volume of 180 milliliters. After cooling the 180 milliliters of solution in a refrigerator (about five degrees centigrade), the solution was filtered giving 11.9 grams of material. This material was redissolved in 500 milliliters of ethyl acetate, the ethyl acetate solution was concentrated to 150 milliliters, refrigerated as before to give 6.15 grams of crude 6β-methylhydrocortisone of melting point 220–223.

Recrystallization of the crude 6β-methylhydrocortisone three more times from ethyl acetate gave an analytical sample of 6β-methylhydrocortisone with melting point 223 to 227 degrees centigrade, rotation $[\alpha]_D$ plus 105 degrees in acetone;

ultraviolet adsorption $\lambda_{max.}^{95\% \text{ ethanol}}$ 243 mμ

$a_m = 14{,}500$.

Analysis.—Calcd. for $C_{22}H_{32}O_5$: C, 70.17; H, 8.57. Found: C, 70.54; H, 8.91.

PREPARATION 9

6α-ethylhydrocortisone

In the same manner as shown in Preparation 7, 5α,11β,17α,21-tetrahydroxy-6β-ethylallopregnane-3,20-dione was treated with a solution of potassium hydroxide in methanol to give at room temperature 6α-ethylhydrocortisone of melting point 223–226 degrees centigrade and $\lambda_{max}^{EtOH}$ 243

$\epsilon = 14,525$.

In the same manner dehydrating with an alkali metal hydroxide in alcoholic solution other 11-oxygenated-5α,17α,21-trihydroxy-6β-alkylallopregnane-3,20-diones produced the corresponding 11-oxygenated-6α-alkyl-17α,21-dihydroxy-4-pregnene-3,20-diones such as 6α-propylhydrocortisone, 6α-butylhydrocortisone, 6α-isobutylhydrocortisone, 6α-pentylhydrocortisone, 6α-hexylhydrocortisone, 6α-phenylhydrocortisone, 6α-methylhydrocortisone of melting point 212.5 to 215 degrees centigrade, 6α-ethylcortisone, 6α-propylcortisone, 6α-isopropylcortisone, 6α-butylcortisone, 6α-pentylcortisone, 6α-hexylcortisone, 6α-phenylcortisone, and the like.

EXAMPLE 1

6α-methyl-11β,17α,21-trihydroxy-4-pregnene-3,20-dione 21-methanesulfonate (6-methylhydrocortisone 21-methanesulfonate)

A solution was prepared containing one gram (2.65 millimoles) of 6α-methylhydrocortisone in seven milliliters of pyridine. This solution was cooled to zero degrees centigrade and treated with 0.3 milliliter of methanesulfonyl chloride. Thereafter the solution was allowed to stand at zero to five degrees centigrade for a period of two hours. The reaction mixture was then diluted with water and extracted with three 25-milliliter portions of methylene chloride. The extracts were combined, washed with cold dilute hydrochloric acid (until a pH of two to three was maintained in the aqueous layer), then washed again with cold sodium bicarbonate solution, water, and finally dried over anhydrous sodium sulfate. Evaporation of the methylene chloride extract at reduced pressure gave a white glassy product of 6α-methyl-11β,17α,21-trihydroxy-4-pregnene-3,20-dione 21-methanesulfonate.

EXAMPLE 2

6α-methyl-11β,17α,-dihydroxy-21-idodo-4-pregnene-3,20-dione

The crude methanesulfonate of Example 1 was dissolved in fifteen milliliters of acetone and treated with a solution of one gram of sodium iodide in ten milliliters of acetone. The mixture was heated under reflux with stirring for a period of fifteen minutes, the heat then reduced and the mixture concentrated to dryness at reduced pressure to give 6α-methyl-11β,17α-dihydroxy-21-iodo-4-pregnene-3,20-dione.

EXAMPLE 3

6α-methyl-11β,17α,-dihydroxy-4-pregnene-3,20-dione

The crude 6α-methyl-11β,17α-dihydroxy-21-iodo-4-pregnene-3,20-dione, as obtained in Example 2, was slurried with fifteen milliliters of acetic acid and stirred for a period of 45 minutes. Thereafter one gram of zinc dust was added and stirring continued for fifteen minutes. The excess zinc dust was removed by filtration, the filtrate was diluted with methylene chloride and washed with water and cold sodium bicarbonate solution until all acetic acid was neutralized. After drying over anhydrous sodium sulfate, the solution was chromatographed over 75 grams of Florisil anhydrous magnesium silicate taking fractions of 200 milliliters each as follows: fourteen fractions of acetone Skellysolve B containing ten percent acetone and one fraction of 100 percent acetone.

Fractions eight through thirteen, inclusive, were combined and evaporated to give 760 milligrams of crystals which after recrystallization from acetone-Skellysolve B hexanes yielded in two crops 650 milligrams of 6α-methyl-11β,17α-dihydroxy-4-pregnene-3,20-dione of melting point 203–210 degrees centigrade.

*Analysis.*—Calcd. for $C_{22}H_{32}O_4$: C, 73.30; H, 8.95. Found: C, 73.19; H, 8.59.

EXAMPLE 4

6α-methyl-17α,-hydroxy-4-pregnene-3,11,20-trione

A mixture was prepared containing 0.5 gram of 6α-methyl-11β,17α-dihydroxy-4-pregnene-3,20-dione, 0.15 gram of chromic acid, ten milliliters of glacial acetic acid and one-half milliliter of water. This mixture was stirred and thereupon maintained for eight hours at room temperature. Thereafter the mixture was poured into fifty milliliters of ice water, neutralized by the addition of dilute sodium hydroxide and the thus obtained precipitate collected on a filter and recrystallized from ethyl acetate and Skellysolve B hexanes three times, to give 6α-methyl-17α-hydroxy-4-pregnene-3,11,20-trione.

EXAMPLE 5

6α-ethyl-11β,17α,21-trihydroxy-4-pregnene-3,20-dione 21-toluenesulfonate (6α-ethylhydrocortisone 21-toluenesulfonate)

In the same manner given in Example 1, 6α-ethylhydrocortisone, dissolved in pyridine, was treated with toluenesulfonyl chloride to give 6α-ethyl-11β,17α,21-trihydroxy-4-pregnene-3,20-dione 21-toluenesulfonate.

EXAMPLE 6

6α-ethyl-11β,17α-dihydroxy-21-iodo-4-pregnene-3,20-dione

In the same manner given in Example 2, heating 6α-ethyl-11β,17α,21-trihydroxy-4-pregnene-3,20-dione 21-toluenesulfonate with sodium iodide in acetone yielded 6α-ethyl-11β,17α-dihydroxy-21-iodo-4-pregnene-3,20-dione.

EXAMPLE 7

6α-ethyl-11β,17α-dihydroxy-4-pregnene-3,20-dione

The 6α-ethyl-11β,17α-dihydroxy-21-iodo-4-pregnene-3,20-dione was dissolved in a fifty percent aqueous acetic acid solution. Thereto was added an excess of sodium bisulfite and the mixture was stirred for an hour at room temperature. Thereafter the mixture was poured into excess of water and extracted with methylene chloride. The methylene chloride extracts were combined, washed with water, bicarbonate, then water again, dried over anhydrous sodium sulfate and evaporated to give crude 6α-ethyl-11β,17α-dihydroxy-4-pregnene-3,20-dione which was purified by recrystallization from acetone-Skellysolve B hexanes to give the pure 6α-ethyl-11β,17α-dihydroxy-4-pregnene-3,20-dione.

EXAMPLE 8

6α-ethyl-7α-hydroxy-4-pregnene-3,11,20-trione

To 200 milligrams of 6α-ethyl-11β,17α-dihydroxy-4-pregnene-3,20-dione in eight milliliters of methanol was added 0.2 milliliter of pyridine, 0.4 milliliter of water and 150 milligrams of N-bromoacetamide. The reaction mixture was kept at room temperature for a period of twenty hours and then 25 milliliters of dilute sodium sulfite solution was added to destroy excess N-bromoacetamide. The mixture was thereupon concentrated under reduced pressure until copious crystallization occurred. The mixture was then cooled to zero degrees centigrade and kept at this temperature for a period of one hour, the crystals recovered by filtration, recrystallized from acetone-Skellysolve B-hexanes to yield pure 6α-ethyl-17α-hydroxy-4-pregnene-3,11,20-trione,

EXAMPLE 9

6α-methyl-17α-hydroxy-4-pregnene-3,11,20-trione

In the same manner shown in Example 1, treating 6α-methylcortisone with methanesulfonyl chloride in pyridine solution yielded 6α-methyl-17α,21-dihydroxy-4-pregnene-3,11,20-trione 21-methanesulfonate; refluxing in the manner given in Example 2, 6α-methyl-17α,21-dihydroxy-4-pregnene-3,11,20-trione 21-methanesulfonate with potassium iodide in acetone yielded 6α-methyl-17α-hydroxy-21-iodo-4-pregnene-3,11,20-trione and reducing with zinc and acetic acid the thus obtained 6α-methyl-17α-hydroxy-21-iodo-4-pregnene-3,11,20-trione as shown in Example 3 yielded 6α-methyl-17α-hydroxy-4-pregnene-3,11,20-trione.

EXAMPLE 10

In the same manner shown in Example 1, treating other 6α-alkylhydrocortisones and 6α-alkylcortisones with the chlorides or bromides of toluenesulfonic acid, methanesulfonic acid and other organic sulfonic acids, give the corresponding 21-toluenesulfonates, the 21-methanesulfonates, or the like, of the corresponding 6α-alkylhydrocortisone and 6α-alkylcortisones wherein the alkyl group may be methyl, ethyl, propyl, isopropyl, butyl, isobutyl, pentyl, hexyl, phenyl, or the like.

Treating the thus obtained 21-toluenesulfonate, 21-methanesulfonate or other 21-alkyl- or arylsulfonates of 6α-alkylhydrocortisone and 6α-alkylcortisone with sodium or potassium iodide in acetone at elevated temperature, usually reflux temperature, yields the corresponding 21-iodo compound such as, for example, 6α-propyl-11β,17α-dihydroxy-21-iodo-4-pregnene-3,20-dione, 6α-isopropyl-11β,17α-dihydroxy-21-iodo-4-pregnene-3,20-dione, 6α-butyl-11β,17α-dihydroxy-21-iodo-4-pregnene-3,20-dione, 6α-isobutyl-11β,17α-dihydroxy-21-iodo-4-pregnene-3,20-dione, 6α-pentyl-11β,17α-dihydroxy-21-iodo-4-pregnene-3,20-dione, 6α-phenyl-11β,17α-dihydroxy-21-iodo-4-pregnene-3,20-dione, 6α-methyl-17α-hydroxy-21-iodo-4-pregnene-3,11,20-trione, 6α-ethyl-17α-hydroxy-21-iodo-4-pregnene-3,11,20-trione, 6α-propyl-17α-hydroxy-21-iodo-4-pregnene-3,11,20-trione, 6α-isopropyl-17α-hydroxy-21-iodo-4-pregnene-3,11,20-trione, 6α-isobutyl-17α-hydroxy-21-iodo-4-pregnene-3,11,20-trione, 6α-pentyl-17α-hydroxy-21-iodo-4-pregnene-3,11,20-trione, 6α-hexyl-17α-hydroxy-21-iodo-4-pregnene-3,11,20-trione, 6α-phenyl-17α-hydroxy-21-iodo-4-pregnene-3,11,20-trione, and the like.

Instead of the 6α-methylhydrocortisone, or cortisone, the 6β-epimer can be used in the above Examples 1 thru 10 and if the reaction conditions are kept near neutral, the 6β-epimers, such as 6β-methyl-11β,17α-dihydroxy-4-pregnene-3,20-dione and 6β-methyl-17α-hydroxy-4-pregnene-3,11,20-trione can be isolated from the reaction mixture. The thus-obtained β-epimers yield the 6α-epimers by treatment with acid or bases in an organic solvent, e. g., ethanol, at room temperature.

EXAMPLE 11

6α-methyl-9α-fluoro-11β,17α-dihydroxy-4-pregnene-3,20-dione

A mixture of one gram of 6α-methyl-11β,17α-dihydroxy-4-pregnene-3,20-dione, 650 milligrams of N-bromoacetamide and six milliliters of pyridine were stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After crystallization from acetone there was obtained about 0.8 gram of 6α-methyl-17α-hydroxy-4,9(11)-pregnadiene-3,20-dione.

0.5 gram of 6α-methyl-17α-hydroxy-4,9(11)-pregnadiene-3,20-dione was dissolved in twenty milliliters of methylene chloride and thereto was added a solution of one milliliter of 71 percent perchloric acid in ten milliliters of water and 200 milligrams of N-bromoacetamide in fifty milliliters of tertiary butyl alcohol. The solution was maintained at room temperature for fifteen minutes and then mixed with a solution of 0.3 gram of sodium sulfite in twelve milliliters of water. The mixture was distilled at reduced pressure until the residual solution became cloudy. The product was then precipitated by the addition of 100 milliliters of a mixture of ice-water. The white crystalline precipitate was filtered, washed with water and then dried and recrystallized from a mixture of acetone and Skellysolve B hexane hydrocarbons to give 6α-methyl-9α-bromo-11β,17α-dihydroxy-4-pregnene-3,20-dione.

A mixture of 0.45 gram of 6α-methyl-9α-bromo-11β,17α-dihydroxy-4-pregnene-3,20-dione, 0.45 gram of anhydrous potassium acetate and twenty milliliters of acetone was heated at its refluxing temperature for a period of five hours. The mixture was then cooled and poured into water and extracted with methylene chloride. The methylene chloride extract was dried and poured over a column of 25 grams of Florisil synthetic magnesium silicate. The column was developed with Skellysolve B hexane hydrocarbons containing increasing portions of acetone. The Skellysolve B plus ten percent acetone eluate contained 6α-methyl-9(11)-oxido-17α-hydroxy-4-pregnene-3,20-dione.

A solution of one gram of 6α-methyl-9(11)oxido-17α-hydroxy-4-pregnene-3,20-dione was dissolved in fifty milliliters of methylene chloride and thereto was added five milliliters of 48 percent hydrofluoric acid and 0.5 milliliter of 71 percent perchloric acid. The mixture was stirred vigorously for six hours and then poured into an excess of cold aqueous five percent sodium bicarbonate solution. The methylene chloride layer was separated, dried over anhydrous sodium sulfate and then poured thru a column of 100 grams of Florisil synthetic magnesium silicate. The column was developed with Skellysolve B hexanes and acetone, the fractions containing ten percent acetone were recrystallized from acetone and Skellysolve B hexanes to give pure 6α-methyl-9α-fluoro-11β,17α-dihydroxy-4-pregnene-3,20-dione.

Following the procedure described in Example 11, but substituting other 6α-alkyl-11β,17α-dihydroxy-4-pregnene-3,20-diones for the 6α-methyl-11β,17α-dihydroxy-4-pregnene-3,20-dione wherein the alkyl radical is ethyl, propyl, isopropyl, butyl, isobutyl, pentyl, hexyl, phenyl, or the like, results in the corresponding 6α-alkyl-9α-fluoro-11β,17α-dihydroxy-4-pregnene-3,20-dione wherein the alkyl group will be ethyl, propyl, isopropyl, butyl, isobutyl, pentyl, hexyl, phenyl, or the like.

EXAMPLE 12

6α-methyl-9α-fluoro-17α-hydroxy-4-pregnene-3,11,20-trione

Oxidizing in the manner given in Example 8, 6α-methyl-9α-fluoro-11β,17α-dihydroxy-4-pregnene-3,20-dione with N-bromoacetamide in pyridine solution produces 6α-methyl-9α-fluoro-17α-hydroxy-4-pregnene-3,11,20-trione.

In the manner given in Example 12, oxidizing with N-bromoacetamide in pyridine solution or with chromic anhydride in acetic acid solution like in Example 4, other 6α-alkyl-9α-fluoro-11β,17α-dihydroxy-4-pregnene-3,20-dione results in the corresponding 6α-alkyl-9α-fluoro-17α-hydroxy-4-pregnene-3,11,20-triones wherein the alkyl group is ethyl, propyl, isopropyl, butyl, isobutyl, pentyl, hexyl, phenyl, or the like.

The present application is a continuation-in-part of application Serial No. 608,661, filed September 10, 1956, now abandoned.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:
1. A compound selected from the group consisting of 6-methyl-11β,17α-dihydroxy-4-pregnene-3,20-dione and 6-methyl-17α-hydroxy-4-pregnene-3,11,20-trione.
2. 6-methyl-11β,17α-dihydroxy-4-pregnene-3,20-dione.
3. 6α-methyl - 11β,17α - dihydroxy - 4 - pregnene-3,20-dione.
4. 6-methyl-17α-hydroxy-4-pregnene-3,11,20-trione.
5. 6α-methyl-17α-hydroxy-4-pregnene-3,11,20-trione.

References Cited in the file of this patent

UNITED STATES PATENTS

| | | |
|---|---|---|
| 2,684,968 | Bergstrom | July 27, 1954 |
| 2,752,369 | Holysz | June 26, 1956 |
| 2,767,199 | Djerassi | Oct. 16, 1956 |

OTHER REFERENCES

Tannhauser: JACS, vol. 78, pages 2658–9, June 5, 1956.

Fieser and Fieser: National Products Related to Phenanthrene, third edition, 1949, page 348.

UNITED STATES PATENT OFFICE

Certificate of Correction

Patent No. 2,867,633

January 6, 1959

Frank H. Lincoln, Jr., et al.

It is hereby certified that error appears in the printed specification of the above numbered patent requiring correction and that the said Letters Patent should read as corrected below.

Column 1, line 18 for "-icdo" read —-iodo—; column 3, lines 35 and 36, for "tetracyline" read —tetracycline—; column 6, line 23, for "dropwse" read —dropwise—; column 9, line 46, in the heading, for "-idodo-" read —-iodo- —; column 10, line 60, in the heading, for "-7α-" read —-17α- —; column 11, line 42 should appear as shown below instead of as in the patent —iodo-4-pregnene-3,11,20-trione, 6α-butyl-17α-hydroxy-21-iodo-4-pregnene-3,11,20-trione, 6α-isobutyl-17α-hydroxy- —.

Signed and sealed this 21st day of July 1959.

[SEAL]

Attest:
KARL H. AXLINE,
*Attesting Officer.*

ROBERT C. WATSON,
*Commissioner of Patents.*